July 6, 1965
H. L. DUNLAP
3,192,878
CROSS MEMBER
Filed May 9, 1962
2 Sheets-Sheet 1
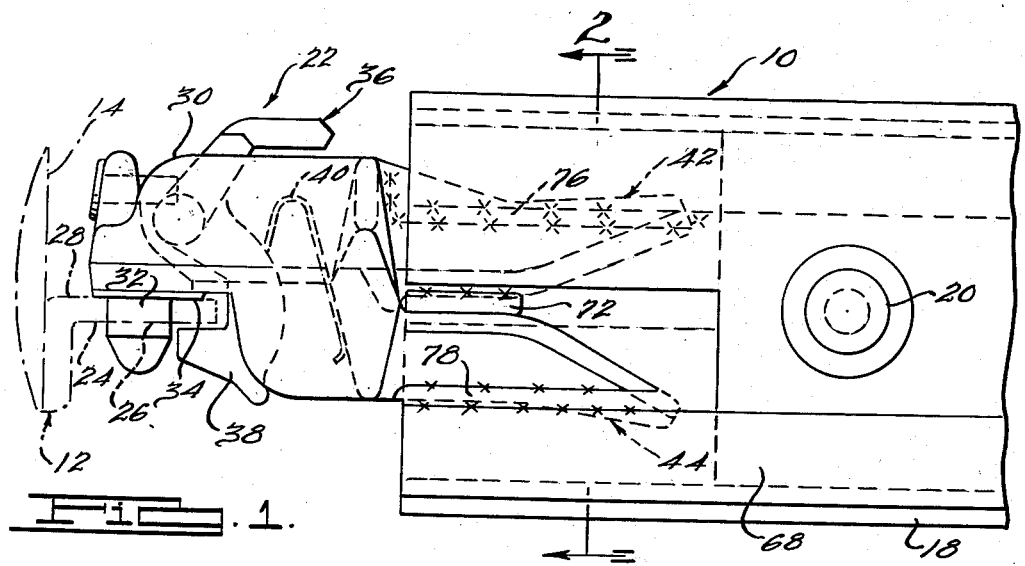
FIG. 1.
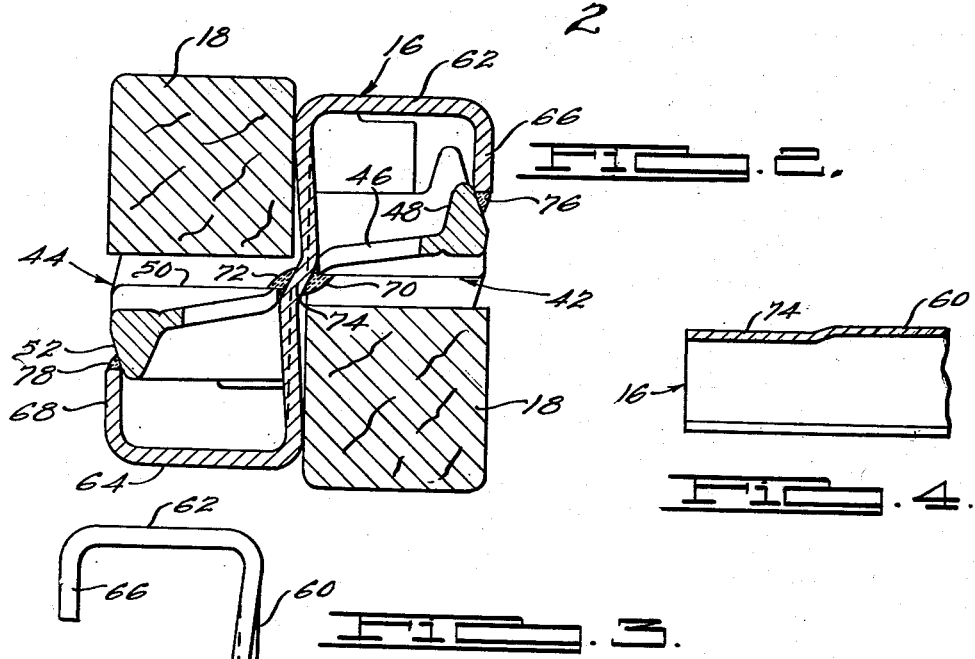
FIG. 2.
FIG. 4.
FIG. 3.
INVENTOR.
Henry L. Dunlap,
BY
Harness, Dickey & Pierce
ATTORNEYS.

July 6, 1965
H. L. DUNLAP
3,192,878
CROSS MEMBER
Filed May 9, 1962
2 Sheets-Sheet 2
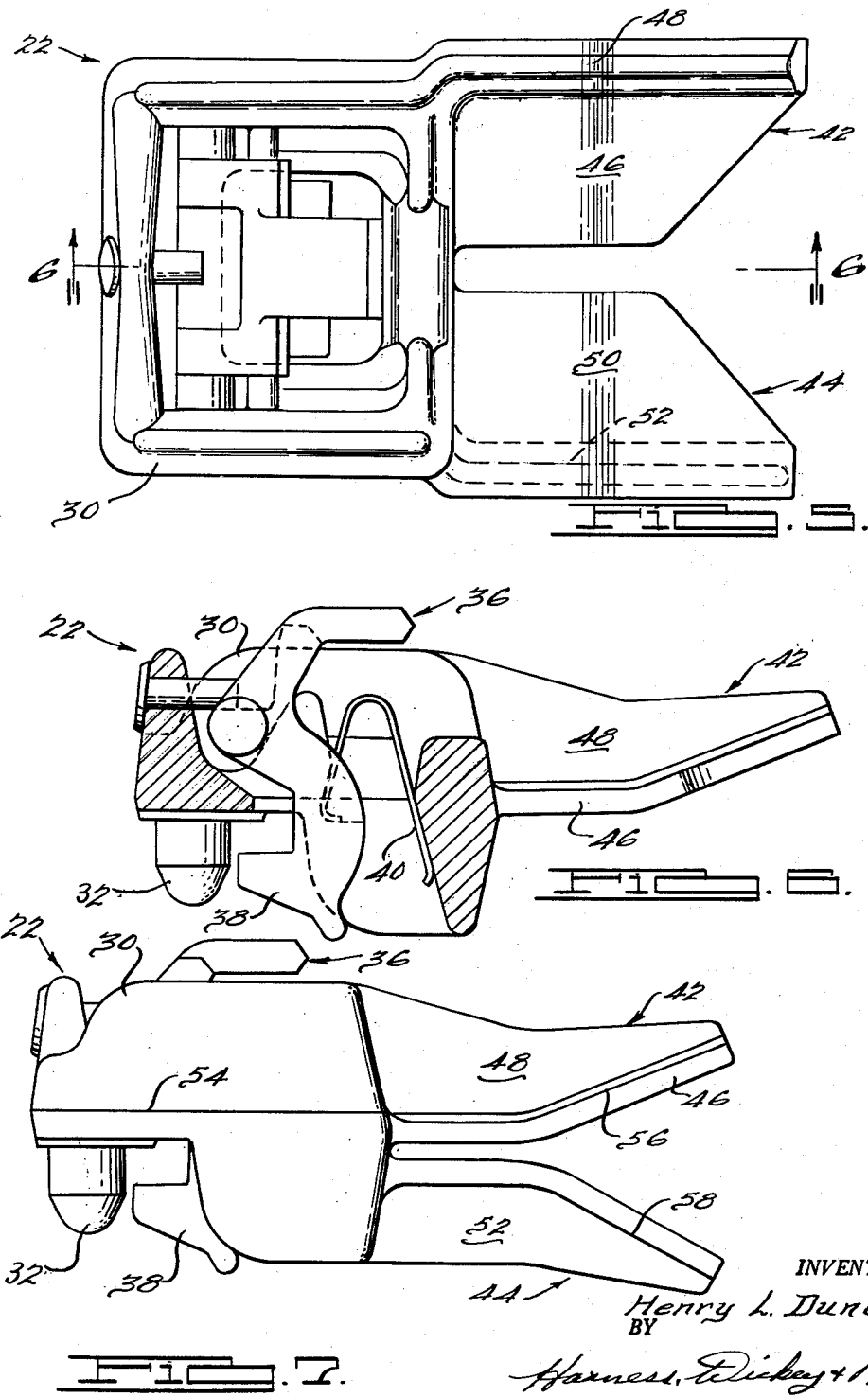
INVENTOR.
Henry L. Dunlap.
BY
Harness, Dickey & Pierce
ATTORNEYS.

United States Patent Office 3,192,878
Patented July 6, 1965

3,192,878
CROSS MEMBER
Henry L. Dunlap, Detroit, Mich., assignor to Evans Products Company, Plymouth, Mich., a corporation of Delaware
Filed May 9, 1962, Ser. No. 193,573
4 Claims. (Cl. 105—369)

The present invention relates to freight bracing apparatus and more particularly, to an improved freight loading crossbar construction adapted to be connected between suitable supports for supporting or bracing freight in a freight storage area.

It is an object of the present invention to provide an improved crossbar construction which is simple in design, economical of manufacture, sturdy and durable in construction and reliable and efficient in operation.

The assignee of the present application has for several years marketed crossbars, the body portions of which include a metal reinforcing member which is generally Z-shaped in cross section, and wood strips secured to opposite sides of the central web of the Z-shaped reinforcing member. A crossbar of this general type is shown in United States Letters Patent No. 2,887,963 granted on application of the present applicant to the assignee of the present application on May 26, 1959. The just mentioned patent shows a crossbar having an end fitting for connecting the crossbar to a belt rail having a load supporting surface which is substantially parallel to the web of the crossbar reinforcing member. The aforementioned patent discloses and claims a crossbar construction including improved means for connecting the end fitting to the web of the crossbar reinforcing member. It is an object of the present invention to provide an improved crossbar construction in which the portion of the crossbar reinforcing member extends generally at right angles to the corresponding load supporting surface of the support to which the end fitting is to be connected and including an improved construction connecting the end fitting to the crossbar reinforcing member.

More specifically, it is an object of the present invention to provide an improved crossbar construction including novel means for connecting an end fitting similar in construction to the end fitting shown in FIGURES 1 to 8 of Patent No. 2,887,963, to a crossbar reinforcing member similar to the one there shown, with the end fitting turned through an angle of 90° relative to the crossbar reinforcing member, from the position shown in those figures of that patent.

Other and more detailed objects of the present invention will be apparent to those skilled in the art from a consideration of the following specification, the appended claims, and the accompanying drawings wherein:

FIGURE 1 is a broken side elevational view of one end of a crossbar embodying the present invention and showing in broken lines a co-operating supporting member to which the crossbar is connected;

FIGURE 2 is a transverse sectional view of the construction illustrated in FIGURE 1, taken substantially along the line 2—2 thereof;

FIGURE 3 is an end view of the reinforcing member of the crossbar construction shown in FIGURE 1;

FIGURE 4 is a sectional view of the reinforcing member shown in FIGURE 3, taken substantially along the line 4—4 thereof;

FIGURE 5 is a plan view of the end fitting of the crossbar construction illustrated in FIGURE 1;

FIGURE 6 is a longitudinal sectional view of the end fitting illustrated in FIGURE 5, taken substantially along the line 6—6 thereof; and, FIGURE 7 is a side elevational view of the end fitting illustrated in FIGURE 5.

Referring to FIGURE 1 of the drawings, one end of a crossbar, generally indicated at 10, is there illustrated and shown connected to a supporting element shown in broken lines at 12 in the form of an angle-shaped belt rail secured to a supporting wall 14. The crossbar 10 includes a generally Z-shaped metal reinforcing member generally indicated at 16, a pair of wood strips 18 which may be suitably secured thereto by bolts 20, and a pair of end fittings secured to opposite ends thereof and one of which is shown in FIGURE 1 and generally indicated at 22. In constructions in which the spacing between the supporting elements 12 between which the crossbar is connected may vary, as for example, when the supporting elements 12 are carried on side walls 14 of a railway freight car, or on the side walls of a truck. The end fitting at the end of the crossbar 10, opposite to that shown in FIGURE 1, is telescopically connected to provide for variations in the effective length of the crossbar. The end fitting 22 illustrated in FIGURE 1 is of the type known as a fixed end fitting which refers to the fact that this end fitting may not move telescopically relative to the crossbar body.

In the embodiment illustrated the end fitting 22 is adapted for connection to a supporting element 12 including a horizontal flange 24 provided with a plurality of apertures 26 spaced therealong and having a horizontal supporting surface 28. The end fitting 22 includes a body portion 30 carrying a pair of spaced downwardly extending pins 32 adapted to project into two of the apertures 26. The body 30 also has a supporting surface 34 adapted to engage and rest upon the surface 28 of the supporting member flange 24. The body 30 also pivotally supports a latch 36 which includes a hook portion 38 adapted to extend below the support member flange 24 to prevent withdrawal of the pins 32 from the apertures 26. A spring 40 acts between the body 30 and the latch 37 to yieldably urge the latch to the above described position in which the hook 38 thereof extends below the flange 24.

Referring to FIGURES 5, 6 and 7, the end fitting 22 includes a pair of independent spaced legs generally indicated at 42 and 44 by means of which the end fitting 22 is secured to the reinforcing member 16 of the crossbar. In the embodiment illustrated, each of the legs 42 and 44 is angle shaped in cross section, the upper leg 42 including flanges 46 and 48 and the lower leg 44 including flanges 50 and 52. In the embodiment illustrated, the end fitting body 30, with the legs 42 and 44 integral therewith, are formed as a forging and the line 54 (see FIGURE 7) on the body 30 is a parting line of the forging dies and similarly, the lines 56 and 58 on the legs 42 and 44 are parting lines of the forging dies.

The generally Z-shaped reinforcing member 16 of the crossbar 10, in the embodiment illustrated, is formed of a suitable gauge sheet metal and includes a central web 60 and a pair of flange portions 62 and 64 extending in opposite directions from opposite edges of the central web 60 as best illustrated in FIGURES 2 and 3. These flanges 62 and 64 terminate in laterally turned flange portions 66 and 68, respectively, which extend parallel to the web portion 60 in a direction toward the center thereof as clearly illustrated in the drawings. The end fitting 22 is disposed with the legs 42 and 44 thereof disposed on opposite sides of the web 60 and with the flanges 46 and 50 thereof extending at right angles to the web 60 with the adjacent edge portion of these flanges welded to the web portion 60 as indicated at 70 and 72. It will be noted that the spacing between the legs 42 and 44 is substantially greater than the thickness of the web 60 and that the flanges 46 and 50 are spaced in a direction parallel to the web 60, or in a vertical direction as viewed in FIGURE 2, by a distance substantially equal to the thickness of the web 60. To facilitate the welding of these flanges at 70 and 72, a central portion of the web is twisted as indicated at 74. This twisted portion 74 extends only throughout that portion of the length of the web 60 which is welded to the legs 42 and 44, the extent of this twisted portion being indicated in FIGURE 4. The other flanges 48 and 52 of the end fitting legs extend generally parallel to the central web 60 in spaced relation thereto so as to be generally aligned with the inwardly turned end portions 66 and 68, respectively, of the flanges 62 and 64 and are welded thereto as indicated at 76 and 78, respectively. It will thus be seen that each of the legs 42 and 44 co-operates with the central web 60 and one of the flanges 62 and 64 to which it is welded to provide a generally box-shaped section, thereby affording a very strong connection between the end fitting 22 and the Z-shaped metal reinforcing member 16.

It may be noted that the end fitting 22 of the present application and the end fitting 13 of the above mentioned Dunlap Patent No. 2,887,963 may be formed from the same forging, the present end fitting differing from the end fitting of the above mentioned Dunlap patent only in that the end portions of the legs 42 and 46 are deformed to diverge from one another, as best illustrated in FIGURE 7. This enables the welds 76 and 78 to extend all the way to the outer ends of the legs 42 and 44.

While only one specific embodiment of the invention has been illustrated and described in detail herein, it will be readily appreciated by those skilled in the art that numerous modifications and changes may be made without departing from the spirit of the present invention.

What is claimed is:

1. In a crossbar of the type described, a crossbar body including a longitudinally extending metal reinforcing member having a central web and a pair of flanges at opposite sides of said web and extending in substantially opposite directions therefrom, an end fitting including an attachment portion adapted to be attached to a suitable support and a pair of independent spaced legs disposed on opposite sides of said central web, each of said legs having a first portion extending at right angles to said central web and having an edge extending along and welded to said web, each of said legs also having a second portion integral with and extending generally at right angles thereto and parallel to said central web and having a portion extending along and welded to one of said flanges of said reinforcing member, each of said legs co-operating with one of said flanges and an adjacent part of said central web to define a box-shaped section.

2. In a crossbar of the type described, a crossbar body including a longitudinally extending metal reinforcing member having a central web and a pair of flanges at opposite sides of said web and extending in substantially opposite directions therefrom, an end fitting including an attachment portion adapted to be attached to a suitable support and a pair of independent spaced legs disposed on opposite sides of said central web, each of said legs being angle-shaped in cross section and including one flange extending substantially at right angles to said central web adjacent the center thereof and having an edge extending along and welded to said center web, each of said legs having another flange extending in spaced and generally parallel relation to said central web and having a portion extending along and welded to one of said flanges of said reinforcing member, each of said legs co-operating with one of said flanges of said reinforcing member and with an adjacent part of said central web to define a box-shaped section.

3. In a crossbar of the type described, a crossbar body including a longitudinally extending metal reinforcing member having a central web and a pair of flanges at opposite sides of said web and extending in substantially opposite directions therefrom, terminating in laterally turned flange portions extending toward one another and generally parallel to said central web, an end fitting including an attachment portion adapted to be attached to a suitable support and a pair of independent spaced legs disposed on opposite sides of said central web, each of said legs having a first portion extending at right angles to said central web and having an edge extending along and welded to said web, each of said legs also having a second portion integral with and extending generally at right angles thereto and parallel to said central web and having a portion extending along and welded to one of said laterally turned flange portions, each of said legs co-operating with one of said flanges of said reinforcing member including the laterally turned flange portion thereof and with an adjacent part of said central web to define a box-shaped section.

4. In a crossbar of the type described, a crossbar body including a longitudinally extending metal reinforcing member having a central web and a pair of flanges at opposite sides of said web and extending in substantially opposite directions therefrom, terminating in laterally turned flange portions extending toward one another and generally parallel to said central web, an end fitting including an attachment portion adapted to be attached to a suitable support and a pair of independent spaced legs disposed on opposite sides of said central web, each of said legs in addition to being spaced to receive said central web therebetween also being spaced along said web, said central web having a twisted central portion to provide offset portions at opposite sides of said web each disposed adjacent one of said legs, each of said legs being angle-shaped in cross section and including one flange extending substantially at right angles to said central web at one of said offset portions and having an edge extending along and welded to such offset portion, each of said legs having another flange extending in spaced and generally parallel relation to said central web and having a portion extending along and welded to one of said flanges of said reinforcing member, each of said legs co-operating with one of said flanges of said reinforcing member and with an adjacent part of said central web to define a box-shaped section.

References Cited by the Examiner
UNITED STATES PATENTS 2,514,229 7/50 Fahland _____ 105—369
2,887,963 5/59 Dunlap _____ 105—369

LEO QUACKENBUSH, *Primary Examiner.*